J. W. BROWN.
DRY BATTERY CELL.
APPLICATION FILED SEPT. 14, 1906.

1,033,228.

Patented July 23, 1912.

Witnesses
E. B. Gilchrist
H. R. Sullivan

Inventor
John W. Brown
By Thurston Woodward
Attorney

UNITED STATES PATENT OFFICE.

JOHN W. BROWN, OF CLEVELAND, OHIO, ASSIGNOR TO NATIONAL CARBON COMPANY, OF CLEVELAND, OHIO, A CORPORATION OF NEW JERSEY.

DRY BATTERY-CELL.

1,033,228.  Specification of Letters Patent.  Patented July 23, 1912.

Application filed September 14, 1906. Serial No. 334,603.

*To all whom it may concern:*

Be it known that I, JOHN W. BROWN, a citizen of the United States, residing at Cleveland, in the county of Cuyahoga and State of Ohio, have invented a certain new and useful Improvement in Dry Battery-Cells of which the following is a full, clear, and exact description.

The objects of the invention are to decrease the internal resistance of a dry battery cell, and therefore to increase the current; and to more evenly distribute the current and therefore to cause the substantially uniform consumption of the zinc can, and a corresponding prolongation of the useful life of the cell.

The invention consists in the employment in a dry cell, which is otherwise like the dry cells in common use, of a negative electrode made of carbon, graphite or any suitable mixture of the two, and having a core made of material having high electrical conductivity, preferably metal in the form of a centrally placed rod.

Figure 1:
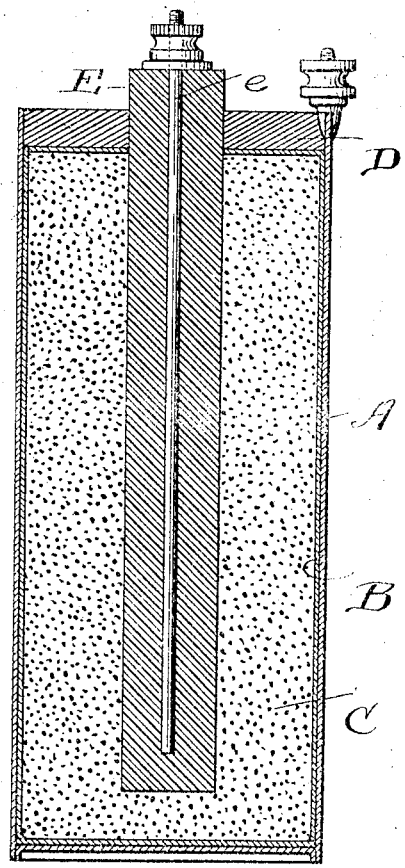
Figure 2:
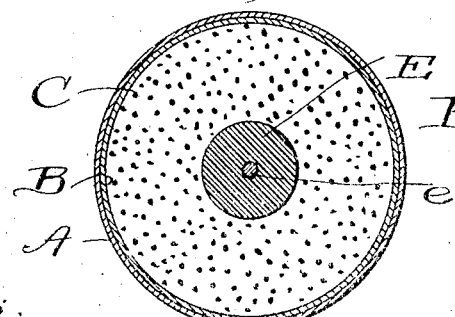

In the drawing Figure 1 is a central, sectional elevation; and Fig. 2 is a sectional plan view of a dry cell embodying the invention.

Referring to the parts shown, A represents the cylindrical zinc can; B the bibulous lining thereof; C the pulverized mixture commonly used as the filling of dry batteries; and D the seal. The parts above named are or may be of the usual construction and arrangement.

E represents the negative electrode which is to be made of carbon or graphite (which is an allotropic form of carbon), or any suitable mixture of carbon and graphite: and is to have a core $e$ which is made of material having high electrical conductivity, preferably of metal in the form of a rod which extends from the top of the electrode down through it centrally to a point near its lower end.

When the core is made of metal the carbon electrode should be soaked in paraffin or its equivalent for eight or ten minutes more or less, so as to partly impregnate it with the paraffin, whereby the corrosion of the core is prevented.

The distance between the electrode E and the zinc can being the same at all points, and the resistance of the core $e$ being very slight, the internal resistance of the cell will be decreased; the current will consequently be increased, and it will be uniformly distributed in the cell. The corrosion of the zinc therefore will be substantially uniform, and the life of the cell will be increased.

Having described my invention I claim:

1. A dry cell comprising a cylindrical zinc cup, a bibulous lining, a battery filling, a centrally placed cylindrical negative electrode, and an axially disposed core embedded within that portion of the electrode which is within the cup and made of material having a higher electrical conductivity than the outer part of the electrode.

2. A dry cell, comprising a cylindrical zinc cup, a bibulous lining, a battery filling, and a centrally placed cylindrical electrode made of a suitable carbon mixture and having a centrally placed metallic core,—the electrode being partly impregnated with paraffin.

3. A dry cell comprising a cylindrical zinc cup, a bibulous lining, a battery filling, and a centrally placed electrode made of a suitable carbon mixture and having a centrally placed metallic core, which core extends from the top downward to a point the distance of which from the lower end of the electrode is substantially equal to the distance measured laterally from said core to the surface of said electrode.

In testimony whereof, I hereunto affix my signature in the presence of two witnesses.

JOHN W. BROWN.

Witnesses:
D. L. ORDWAY,
H. K. RICHARDSON.